T. B. ROGERS, Jr.,
Assignor to himself and P. COOPER.
Shutter Bower and Fastener.
No. 8,616. Reissued Mar. 11, 1879.
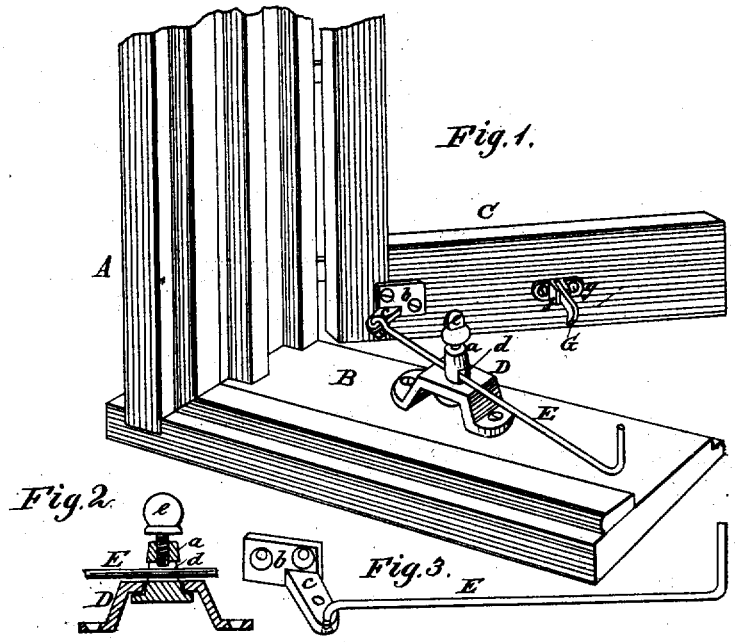
WITNESSES:
Henry N. Miller
C. Sedgwick
INVENTOR:
T. B. Rogers Jr.
BY Munn & Co
ATTORNEYS.
N. PETERS, PHOTO-LITHOGRAPHER, WASHINGTON, D. C.

UNITED STATES PATENT OFFICE.

THOMAS B. ROGERS, JR., OF BROOKLYN, NEW YORK, ASSIGNOR TO HIMSELF AND PETER COOPER, OF NEW YORK CITY.

IMPROVEMENT IN SHUTTER BOWER AND FASTENER.

Specification forming part of Letters Patent No. 203,945, dated May 21, 1878; Reissue No. 8,616, dated March 11, 1879; application filed December 28, 1878.

*To all whom it may concern:*

Be it known that I, THOMAS B. ROGERS, Jr., of Brooklyn, in the county of Kings and State of New York, have invented a new and Improved Adjuster and Fastener for Window-Blinds, &c., of which the following is a specification:

Figure 1 is a perspective view of my improved adjuster and fastener. Fig. 2 is a detail sectional view of the pivotal stud and binding-screw. Fig. 3 is a perspective view of a modified form of a portion of the device.

Similar letters of reference indicate corresponding parts.

The object of my invention is to provide a simple and inexpensive device for adjusting and fastening blinds, shutters, windows, &c.; and it consists of a plain rod jointed to an ear that is attached to the blind, and fastened by a binding-screw in an apertured stud that is pivoted to a sustaining-plate.

Referring to the drawings, A is the window-frame; B, the window-sill; and C is a blind or shutter hinged to the window-frame.

To the sill B is secured a plate, D, which is apertured to receive the loose stud *a*. The plate D is secured in place by screws passing through its offsets or lugs.

To the bottom rail of the blind C a plate, *b*, is secured, from which an ear, *c*, projects at an angle of about forty-five degrees.

The outer end of ear *c* is apertured to receive an eye formed on the end of rod E; or the end of the said rod may be bent at a right angle, and inserted in the aperture of the ear and riveted, as shown in Fig. 3.

The rod E passes through an aperture, *d*, in the stud *a*, and is bent up at its free end, forming a convenient handle for operating the device. A thumb-screw, *e*, passes into the top of the stud *a*, and is capable of clamping the rod E upon the face of the plate D, and at the same time clamping the head of stud *a* against plate D, to prevent axial movement of the stud.

By means of this arrangement the blind may be adjusted and fastened in any desired position.

A catch, G, is pivoted between ears *f*, that project from a plate, *g*, that is attached to the lower rail of the shutter. This catch is supported by a shoulder in a horizontal position, so that when the blind is entirely closed it engages rod E, and serves as an additional means of securing the blind.

I am aware it is not new to combine a lifting and locking rod with a transom journaled upon pivots.

In my device the apertured stud through which the locking-rod passes is capable of turning axially on its sustaining-plate, so that the locking-rod may adjust itself to the position and movement of the blind or window. This construction also permits attachment of the plate *b* nearer to or farther from the hinges of the blind.

Having thus described my invention, I claim as new and desire to secure by Letters Patent—

1. In an adjusting and fastening device for window-blinds, &c., the plate D, loosely-pivoted apertured stud *a*, and screw *e*, combined and arranged for operation in connection with an operating and locking rod, substantially as and for the purposes set forth.

2. The apertured pivotal stud *a*, fitted loosely in its sustaining-plate, the ear-plate *b c*, and rod E, combined substantially as and for the purposes specified.

3. In combination with the apertured pivotal stud *a*, ear-plate *b c*, and rod E, the catch G, as and for the purposes set forth.

THOMS. B. ROGERS, JR.

Witnesses:

C. SEDGWICK,

GEO. D. WALKER.